United States Patent
O'Neill

(10) Patent No.: US 7,249,355 B2
(45) Date of Patent: Jul. 24, 2007

(54) UNIFIED NETWORK THREAD MANAGEMENT

(75) Inventor: Vance O'Neill, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 673 days.

(21) Appl. No.: 10/322,136

(22) Filed: Dec. 18, 2002

(65) Prior Publication Data

US 2004/0123299 A1   Jun. 24, 2004

(51) Int. Cl.
*G06F 9/46* (2006.01)
(52) U.S. Cl. .............. 718/100; 718/102; 719/314; 719/318; 719/328
(58) Field of Classification Search ............ 719/330, 719/314, 318, 328; 718/104, 1, 100, 102, 718/103
See application file for complete search history.

(56) References Cited

U.S. PATENT DOCUMENTS

| | | | | |
|---|---|---|---|---|
| 5,764,915 | A | * | 6/1998 | Heimsoth et al. ........... 709/227 |
| 6,499,047 | B2 | * | 12/2002 | Kikuchi et al. ............ 718/100 |
| 6,687,729 | B1 | * | 2/2004 | Sievert et al. ............. 718/102 |
| 2001/0018701 | A1 | | 8/2001 | LiVecchi .................... 709/105 |
| 2003/0014549 | A1 | | 1/2003 | Seidman et al. ........... 709/310 |
| 2003/0084164 | A1 | | 5/2003 | Mazzitelli .................. 709/227 |
| 2003/0097455 | A1 | | 5/2003 | Bauman et al. ............. 709/230 |

OTHER PUBLICATIONS

Binder et al., Portable resource control in Java, Conference on Object Oriented Programming Systems Languages and Applications pp. 139-155, Year of Publication: 2001.*

Carnes et al., Techniques to enhance performance of an existing aviation simulation, Simulation Conference, 2002. Proceedings of the Winter, vol. 2, Dec. 8-11, 2002 pp. 1219-1225 vol. 2.*

Calcote, J. "Thread Pools and Server Performance", *Dr. Dobbs Journal*, 1997, 22(7), 60-64 and 86-89.

Ling, Y. et al., "Analysis of Optimal Thread Pool Size", *Operating Systems Review*, 2000, 34(2), 42-55.

* cited by examiner

*Primary Examiner*—William Thomson
*Assistant Examiner*—Andy Ho
(74) *Attorney, Agent, or Firm*—Woodcock Washburn LLP

(57) ABSTRACT

In order to provide flexibility for a developer, a network API is provided which allows for a network event (for example, the receipt of data over the network) to be handled by one thread from among a predetermined number of dedicated threads. The number of dedicated threads is specified by the application at runtime and can be modified at runtime as well. Where the number of dedicated threads specified is greater than zero, dedicated threads are created which handle network events and call the specific callback functions of the application in response to the network events. Thus the number of such callback events from threads that can occur at one time is limited by the number of dedicated threads specified by the application. When the number of dedicated threads is specified as zero, no callback events can occur except when the application assigns a certain time period for them. Thus, when the number of dedicated threads created is zero, the application has control over the amount of processing time allotted to the network layer. Network events are handled when the application issues calls a "Do Work" method. While executing this method, network events are handled.

23 Claims, 3 Drawing Sheets

UNIFIED NETWORK THREAD MANAGEMENT

FIELD OF THE INVENTION

The present invention is directed to methods and systems for interfacing an application to a network. More particularly, the present invention relates to an interface for a network application which allows the application to control whether there are threads dedicated to the handling of network events, and, if there are no dedicated threads, when the processing of network events will be handled by the application.

BACKGROUND OF THE INVENTION

The world-wide increase in computer networking bandwidth and the availability of networking has enabled large amounts of data to be transmitted quickly and at low cost to many computer users. The availability of great bandwidth has invited the creation of applications which use a network to communicate with other remote computers in real time. One example of such a network application is a multiplayer network gaming application, in which two or more individual users each have a game client on a computer, and where the users' computers are linked to a network that allow them to communicate with each other, perhaps through a centralized server.

Sending and receiving data over a network is a task which is highly complex, and the details of how the sending and receiving is handled should, to the extent possible, be abstracted to an application. In order to allow developers to create applications without needing to address the details of how networks operate, a communications protocol engine negotiates the handling of network traffic and exposes an application program interface (API) whereby the application can express, as a high-level abstraction, what network operations the application wants to perform. Such APIs provide calling conventions by which the application can access the complex resource of the protocol engine. For example, a network API provides calling conventions with which a networking application can use a network. In this way, a network API, such as the DirectPlay® product available from Microsoft Corporation of Redmond, Wash., provides messaging support that largely insulates an application from the underlying network hardware and software.

An application uses the network API by calling exposed methods of the network API. For example, in DirectPlay, in order to send some data across a network, an application calls the IDirectPlay8Peer::SendTo method.

An API may also communicate with the application through one or more callback functions. These functions are implemented in the application, and a pointer thereto is passed to the network API during initialization. When the networking API needs to communicate with the application, it calls the callback function to notify the application about events that have occurred, such as the receipt of data from another node. For example, when a message is received at a target, the DirectPlay® product will call the target application's callback function, with the parameter DPN_MSGID_RECEIVE, and the accompanying data.

Thus, a game developer who wishes to create a multiplayer network game does not need to have the same sophisticated knowledge of networking when a network API is used that the developer would need to use if the application communicated directly with the network hardware and software without the network API.

In order to handle network events efficiently, some network APIs are multithreaded and will fire multiple events concurrently. It is possible that an application will receive callbacks concurrently, and may receive the callbacks while performing some other type of processing. Dealing with concurrency in an application increases the complexity of the program—which may be justified in certain types of applications, but in others, the simplicity of non-concurrency may outweigh the benefits of concurrency. For example, a client game application may simply wish to run a loop where the processing of game events, drawing the screen, and receiving network traffic are handled serially in an endless loop—without the program having to deal with events that come in while, say, the screen is being drawn.

Additionally, client and server applications implementing network games and other networking applications often have very different processing priorities. When a server application such as a network server is being run, low latency is necessary so that network events are processed and the results presented to the user quickly for the best user experience. This is where the "push" architecture in which networking callbacks arrive on multiple threads is useful. A server can spend all of its processing time handling the network session as quickly as possible. However, it may be useful for the server to limit the number of callbacks it can receive, in order to ensure that traffic received may be processed appropriately.

On the other hand, a client application which is responsible for data presentation (for example, rendering complicated graphics) may need to devote more processing time to such data presentation and less to handling network events. Hence, clients such as network clients frequently have a single thread, which runs a graphics loop as fast as the hardware allows. Such clients process network events on a per-frame basis—only at one point on the loop are network events handled. Implementing handling of multithreaded callbacks may be difficult, and will necessitate complex modification of legacy applications to handle callbacks at points other than the designated time in the graphics loop.

Therefore, it can be seen that the desired responsiveness to events such as network events and the balance between responsiveness and resources usage for other purposes varies based on the application being run. Also, it can be seen that it is difficult for a developer to design scalable, robust applications that can support many online players at a time. Thus, there is a need for a networking API which accommodates both applications which process network events on a per frame basis and applications which process events using a push architecture.

Therefore, it can be seen that there is a need for a networking system that allows for applications to use the network interface with or without dedicated threads (and their attendant concurrency issues), and to use the network interface in a unified manner regardless of whether they choose to use dedicated threads.

SUMMARY OF THE INVENTION

In order to provide flexibility for a developer, a network API is provided which allows for a network event (for example, the receipt of data over the network) to be handled by one thread from among a predetermined number of dedicated threads. The number of dedicated threads is specified by the application at runtime and can be modified at runtime as well. Where the number of dedicated threads specified is greater than zero, dedicated threads are created which handle network events and call the specific callback functions of the application in response to the network events. Thus the number of such callback events from threads that can occur at one time is limited by the number of dedicated threads specified by the application. When the number of dedicated threads created is zero, the application has control over the amount of processing time allotted to the network layer. Network events are handled when the application issues calls to a "Do Work" method. While executing this method, network events are handled.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Applications interacting with a network layer are presented with unified network thread management capabilities. This unified network thread management allows the application to choose to use a certain number of dedicated threads to service network callbacks to the application. The application may also choose to have no dedicated threads, but to service the network callbacks only via a call to a Do Work function which allows tasks necessitating network callbacks to run for a predetermined period (or until all such tasks are completed).

A networking API is presented which allows a developer creating an application optionally to assign the application a thread pool. This thread pool contains a set number of dedicated threads for servicing network tasks. Threads in the thread pool communicate with the application by calling callback functions exposed by the application. This allows the developer of the application to plan for the callbacks, to handle multithreading more easily, and to allow for runtime modification of the number of threads returning messages via callback functions, thereby modifying the use of processing resources. Additionally, the application knows the identity of the threads which can be used to call the callback functions.

Alternatively, the application may set the number of threads in the thread pool to zero. When the size of the thread pool is zero, the application handles network tasks with a "Do Work" instruction. This instruction, when present in application code, will allow for network tasks to be processed for a set amount of time (specified in the Do Work instruction) or until all tasks are completed.

Network events may require timers, for example, packet retries and keepalives. These timers, along with input/output from the network and generic work events are all handled with the dedicated threads (where the thread pool is set to one or more threads) or in the Do Work period (where the thread pool is set to zero.) The networking API includes public methods, such as those required to set up, close, and get information about the thread pool. The Do Work method is also a public method. The networking API also includes internal interface methods, which allow the thread management to be abstracted from the core networking functionality of the networking API and from the networking protocol. In this way neither the core functionality of the networking API nor the networking protocol are affected by operating system differences, number of processors in the system, or the mode in which the application has requested to run (e.g. with a thread pool of size zero, a thread pool of more than zero, or no thread pool).

Exemplary Computing Device

Figure 1:
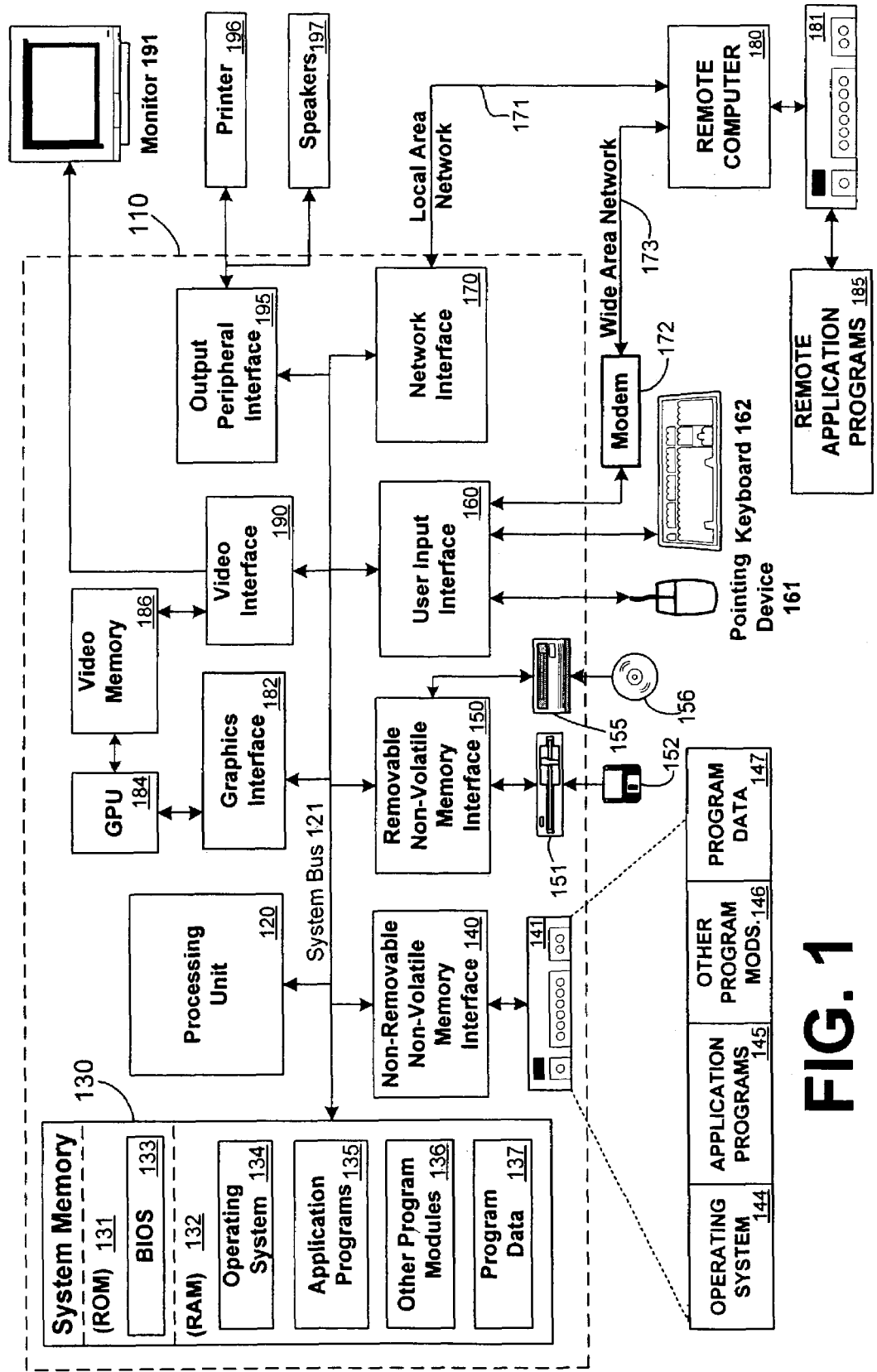
FIG. 1 is a block diagram representing an exemplary non-limiting computing system in which the present invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of .NET's languages and services, and in other distributed computing frameworks as well.

Network API with Unified Network Threading

Figure 2:
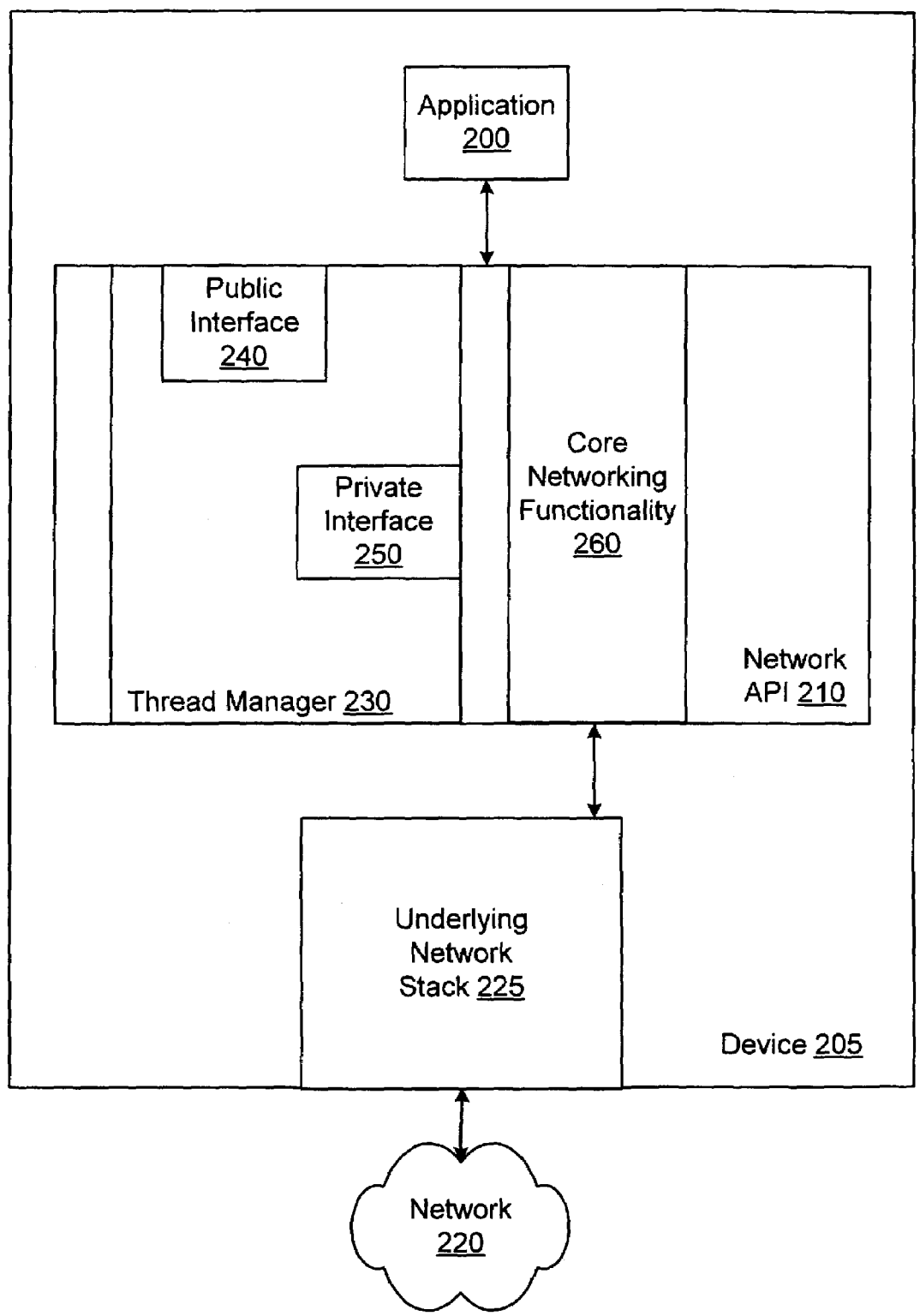
FIG. 2 is a block diagram representing a networked device according to one embodiment of the invention.

As shown in FIG. 2, in a device 205, an application program 200 communicates with a network 220 and via an underlying network stack 225 and network API 210. The application 200 sends data over the network by calling methods of the network API, such as a "SendTo" method. The application 200 calls this method with data to be sent and address information, and the network API 210 then causes the data to be sent over the network 220 to the designated address. When network API 210 receives data from network 220 for application 200, it publishes the information to the application by executing a callback function. The callback functions allow the network API 210 to send messages and associated data to the application 200. These callback functions are registered by application 200 when it initializes the connection to network API 210. The arguments to a callback function may include: a context value, a message type, and data. The context value is a value set by the application 200 when the callback is defined. The message type is set by the network API 210 from among a number of possible messages type for the callback function. The data is the data being passed to the application 200. So, for example, upon receiving data for application 200, the network API 210 calls the callback function, includes the context value specified by the application for that callback function, a message type indicating that the message contains data received from another network node, and the data that was received.

In a preferred embodiment of the invention, the network API 210 includes a thread manager 230. The thread manager 230 includes a public interface 240 with methods that can be called by the application 200. The thread manager 230 also includes a private interface 250 with methods that can be called by core networking functionality 260 of network API 210.

The thread manager 230 allows the application to create a thread pool for executing callbacks. The thread manager 230 can be used to initialize and manage a thread pool with a specified number of threads. If that number is greater than zero, then the thread manager 230 schedules timer checks, input/output ("I/O") operations, and generic work items from the core networking functionality 260 to be performed on the dedicated threads in the thread pool. If that number is equal to zero, then the thread manager 230 schedules the timer checks, I/O operations, and generic work items to be run when a Do Work method is called. The thread manager 230 maintains a queue of work from the core networking functionality 260 to be run on dedicated threads or during a Do Work.

The public interface 240, in an exemplary embodiment, includes the following methods which can be executed by the application 200:

An initialize method, which initializes a thread pool for the application 200. Only one thread pool may be used per application. If a thread pool already exists, an error message is returned;

A close method, which is used to close the thread pool for the application 200. This causes each thread to callback to the application 200 indicating it will be destroyed, and to destroy itself. If a Do Work method is being executed or the close method was called by a thread pool thread, the thread pool is not closed, and an error message is returned;

A get thread count method, which is used to determine the number of thread pool threads for a given processor, or for all processors, depending on the arguments used in calling the method;

A set thread count method, which is used to alter the current number of threads for a given processor, or for all processors. If the new thread count is higher than the previous thread count, the correct number of threads will be started (generating a message to the application 200 through a callback and accepting a context value for use in all callback operations on the thread from the application). If the new thread count is higher than the previous thread count, the correct number of threads will be destroyed (generating a message to the application 200 through a callback); and A Do Work method, which is used to perform any work currently queued. The Do Work method is called with an allowed time slice value specifying an interval. If the time slice value is zero, only one work item on the queue will be performed. If the time slice value is set to INFINITE, then all work in the queue will be performed. Otherwise, the thread will run for the indicated interval. A message is returned which will indicate whether any work remains in the queue. Do Work can only be run if the thread count is equal to zero, otherwise an error message is returned. If an attempt is made to call the Do Work method recursively, within a callback or by more than one thread simultaneously, an error message is returned.

Private interface 250 includes internal interface methods which can only be executed by the core networking functionality 260 internal to the networking API 210. These include, in an exemplary embodiment:

A queue work item method, which queues a work item for processing;

A schedule timer method, which schedules a new work item for processing at some point in the future;

A cancel timer method, which attempts to cancel a timed work item. If the item is already in the process of completing, an error is returned;

A wait-while-working method, which waits for a specific kernel object to become signaled (allowing other items on the thread pool queue to be performed during the wait);

A sleep-while-working method, which does not return for the specified number of milliseconds, but allows thread pool work to be performed during that time;

A request thread count method, which requests a minimum number of threads for the default thread pool. If the user has already set the thread count, then no action is taken. A message is returned indicating whether the thread count was changed to meet the request, was not changed but already met the request, or could not be changed to meet the request.

A get thread count method, which is used to determine the number of thread pool threads for a given processor, or for all processors, depending on the arguments used in calling the method; and A get recursion depth method, which returns the work recursion depth of the thread specified. The recursion depth is the number of times the thread has called Do Work (at most one, since Do Work can not be called recursively) or the number of times the thread has called the wait-while-working or sleep-while-working methods. If the thread is not currently in any of those functions, the depth returned is zero.

Also included in the private interface are methods which allow the tracking of overlapped input/output (I/O) operations. Overlapped or asynchronous I/O is a technique which allows I/O to proceed in parallel with other computation. When an I/O operation is executed synchronously, it does not return until the operation has been completed. This means that the execution of the calling thread can be blocked for an indefinite period while it waits for a time-consuming operation to finish. Functions called for overlapped operation can return immediately, even though the operation has not been completed. This enables a time-consuming I/O operation to be executed in the background while the calling thread is free to perform other tasks. For example, a single thread can perform simultaneous I/O operations on different handles, or even simultaneous read and write operations on the same handle. When the I/O operation has completed, a callback must be performed to provide the result to the application 200.

When overlapped I/O is being used, the application 200 issues an I/O request and the I/O request can proceed asynchronously with processing of other information. Once the overlapped I/O operation has completed, the process is informed of the result of the I/O request, and can then use the data resulting from the I/O request. Overlapped I/O thus allows better utilization of the processing power in the device 205. The overlapped I/O methods available to core networking functionality 260 include, in an exemplary embodiment:

A tracking file I/O method, which tracks overlapped I/O operations for a specified file handle on one processor, or on all processors;

A stop tracking file I/O method, which ends the tracking of overlapped I/O operations for a given file handle;

A create overlapped I/O method, which creates an overlapped structure for an asynchronous I/O operation so it can be monitored for completion;

A submit I/O operation, which submits an overlapped structure for an asynchronous I/O operation so it can be monitored for completion; and A release overlapped I/O method, which returns an unused overlapped structure previously created (called if the overlapped I/O will never complete asynchronously).

Expanded exemplary method descriptions are included in Appendix A.

Figure 3:
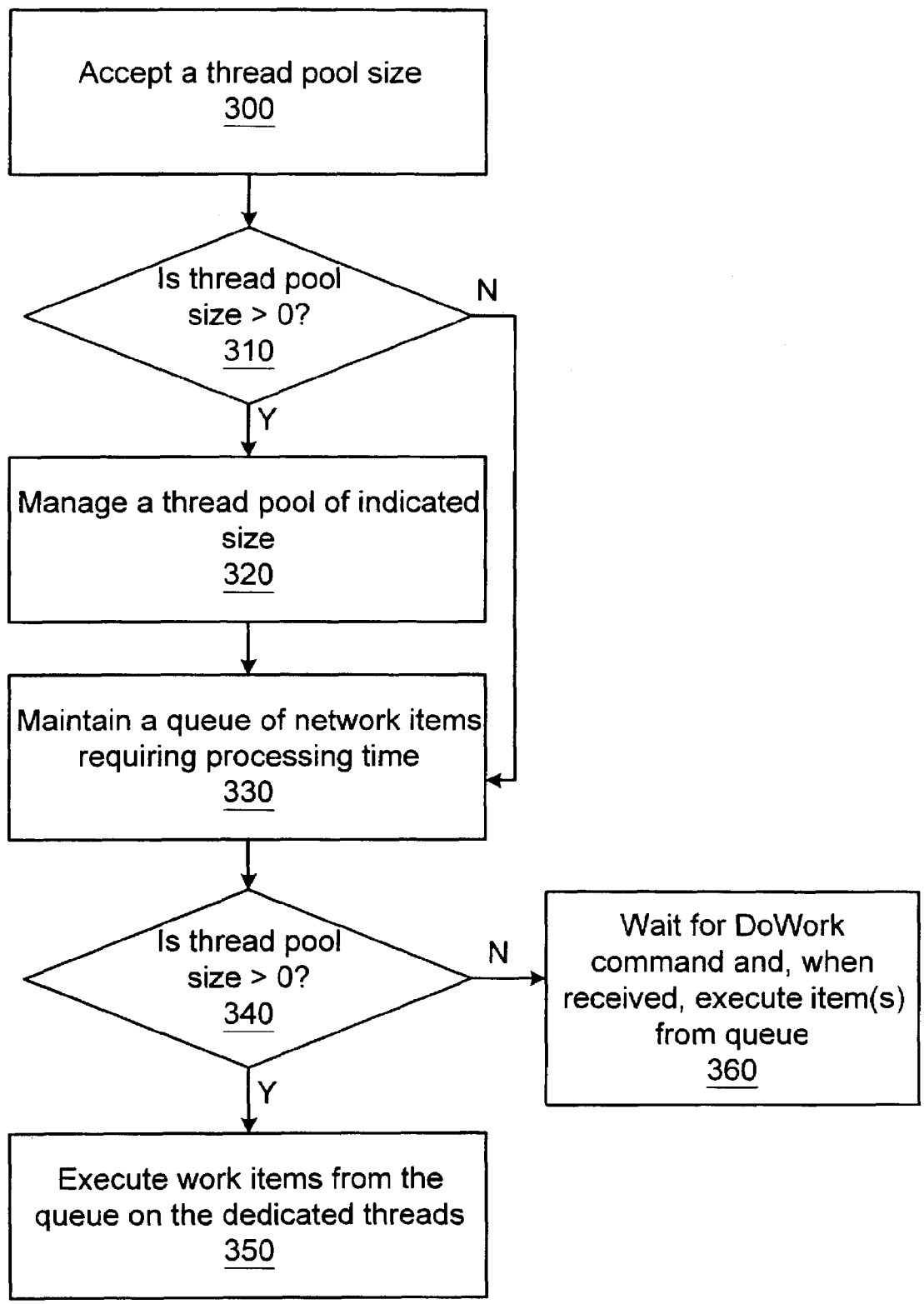
FIG. 3 is a flow diagram representing a method of implementing unified network thread management according to one embodiment of the invention.

As seen in FIG. 3, the thread manager 230 must be able to perform the following steps. First, it must accept a thread pool size indication from the application 200 (step 300). Then, if the thread pool size indication indicates that a thread pool is to be maintained (step 310) the thread manager 230 manages a thread pool of that size (step 320). The thread manager 230 also maintains a queue comprising network work items which require processing time, (step 330). If the size of the thread pool is greater than zero (step 340) the thread manager 230 executes work items from the queue (step 350) on the application's threads that are dedicated for that purpose and managed at step 320. If the size of the thread pool is zero, the manager 230 waits for a Do Work command from said application indicating work items may be executed, step 360, and, when it receives that indication, executes one or more items from the queue. This process continues, with the number of threads in the thread pool possibly varying.

Network work items in the queue can include I/O operations, timers, and generic work items that will involve a callback to the application. Generic work items will simply be a callback to the application 200, for example, the execution of the callback used when data is received over the network. An I/O operation work item will execute a callback to be called when I/O completes. Timers execute callbacks as well. A timer may, for example, be timing whether sending information over the network was successful, and will report back to application 200 when the time has elapsed for the send to be successful regarding whether the send succeeded or failed.

When a dedicated thread is created or when a Do Work command is received, in one embodiment, the dedicated thread or the thread executing the Do Work command runs through a loop for servicing network work events. Each time through the loop the following tasks are performed:

1. Any timers are checked. Any expired timers have their callbacks queued as a network work item;

2. I/O operations are checked. I/O operations that have finished have their callbacks queued as a network work item;
3. A network work item from the queue is dequeued and the callback function is invoked.

Where the size of the thread pool is greater than one, one thread may be devoted to timer checks. This thread checks timers, and if a timer has elapsed, puts the related callback onto the queue. Similarly, a thread may also be dedicated to I/O operation completion checks. Threads other than these dedicated threads then need not perform timer checks or I/O operation completion checks.

The thread pool size can be changed during the execution of application 200. The application 200 may choose to switch between thread pools of different sizes based on performance or other considerations. Additionally an application 200 may switch between (a) thread pool operation, (b) operation with a thread pool size of zero (thereby requiring use of the Do Work function), and (c) operation that uses multithreading (in which there is no limit set by the application on the number of threads performing callbacks).

By giving the application the option of using multithreading (with some threads dedicated for use in network operations at the time decided by the network manager), or the use of a single thread (where work is processed only when the application calls the DoWork( ) function), the use of the network API is highly scalable both for large servers that require the efficiency of multi-threading, and applications that choose to use a single thread to avoid the complexities introduced by concurrency issues. A client application may run a simple loop, including, for example, rendering work and game processing tasks, and can, in that loop, call DoWork with a specified time period, limiting network tasks to that time period and thereby maintaining a high-quality of presentation. Responsiveness and resource utilization can be controlled at run time. Developers can write applications which do not support multithreading, or complex applications which switch between multithreaded and single-threaded operation. Yet, the same API can be used by larger programs, such as network game server, that can make provisions for concurrency in order gain efficiency from multi-threading.

CONCLUSION

As mentioned above, while exemplary embodiments of the present invention have been described in connection with various computing devices and network architectures, the underlying concepts may be applied to any computing device or system in which it is desirable to implement cooperative scheduling of hardware resource elements. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

APPENDIX A

Exemplary Method Descriptions for a Thread Manager

The following are exemplary method descriptions for a thread manager 230. The public interface 240 includes the public methods described, and the private interface 250 includes the internal interface methods described. The description of the methods includes various functions, structures, and constants. It will be understood that these functions, structures, and constants are merely exemplary; any combination or subset of these components (or equivalent components) is included within the spirit and scope of the invention.

Public Method Descriptions

| Public Method Descriptions | |
|---|---|
| IDirectPlay8ThreadPool::Initialize (PVOID const pvUserContext, const PFNDPNMESSAGEHANDLER pfn, const DWORD dwFlags) Arguments: | |
| PVOID pvUserContext | User context for all message callbacks. |
| PFNDPNMESSAGEHANDLER pfn | Pointer to function called to handle thread pool messages. |
| DWORD dwFlags | Flags to use when initializing. |
| Returns: HRESULT | |
| DPN_OK | Initializing was successful. |
| DPNERR_ALREADYINITIALIZED | The interface has already been initialized. |
| DPNERR_INVALIDFLAGS | Invalid flags were specified. |
| DPNERR_INVALIDPARAM | An invalid parameter was specified. |
| DPNERR_NOTALLOWED | Threads have already been started. |
| IDirectPlay8ThreadPool::Close (const DWORD dwFlags) Arguments: | |
| DWORD dwFlags | Flags to use when closing. |
| Returns: HRESULT | |
| DPN_OK | Closing was successful. |
| DPNERR_INVALIDFLAGS | Invalid flags were specified. |
| DPNERR_NOTALLOWED | A thread is in a call to DoWork, or this is a thread pool thread. |
| DPNERR_UNINITIALIZED | The interface has not yet been initialized. |
| IDirectPlay8ThreadPool::GetThreadCount (const DWORD dwProcessorNum, DWORD * const pdwNumThreads, const DWORD dwFlags) Arguments: | |
| DWORD dwProcessorNum | Processor whose thread count should be retrieved, or −1 to retrieve the total number of threads. |
| DWORD * pdwNumThreads | Pointer to DWORD in which to store the current number of threads. |
| DWORD dwFlags | Flags to use when retrieving thread count. |
| Returns: HRESULT | |
| DPN_OK | Retrieving the number of threads was successful. |
| DPNERR_INVALIDFLAGS | Invalid flags were specified. |
| DPNERR_INVALIDPARAM | An invalid parameter was specified. |
| DPNERR_UNINITIALIZED | The interface has not yet been initialized. |
| IDirectPlay8ThreadPool::SetThreadCount (const DWORD dwProcessorNum, const DWORD dwNumThreads, const DWORD dwFlags) Arguments: | |
| DWORD dwProcessorNum | Processor number, or −1 for all processors. |
| DWORD dwNumThreads | Desired number of threads per processor. |
| DWORD dwFlags | Flags to use when setting the thread count. |
| Returns: HRESULT | |
| DPN_OK | Setting the number of threads was successful. |
| DPNERR_INVALIDFLAGS | Invalid flags were specified. |
| DPNERR_INVALIDPARAM | An invalid parameter was specified. |
| DPNERR_NOTALLOWED | A thread is currently calling DoWork, or this thread pool thread is trying to reduce the thread count. |
| DPNERR_UNINITIALIZED | The interface has not yet been initialized. |
| IDirectPlay8ThreadPool::DoWork (const DWORD dwAllowedTimeSlice, const DWORD dwFlags) Arguments: | |
| DWORD dwAllowedTimeSlice | The maximum number of milliseconds to perform work, or INFINITE to allow all immediately available items to be executed. |
| DWORD dwFlags | Flags to use when performing work. |
| Returns: HRESULT | |
| DPN_OK | Performing the work was successful. |
| DPNSUCCESS_PENDING | No errors occurred, but there is work that could not be accomplished due to the time limit. |
| DPNERR_INVALIDFLAGS | Invalid flags were specified. |
| DPNERR_NOTALLOWED | This method is already being called by some thread. |

-continued

| | |
|---|---|
| DPNERR_NOTREADY | The thread count has not been set to 0. |
| DPNERR_UNINITIALIZED | The interface has not yet been initialized. |

Internal Interface Methods Description

IDirectPlay8ThreadPoolWork::QueueWorkItem
(const DWORD dwCPU,
const PFNDPTNWORKCALLBACK pfnWorkCallback,
PVOID const pvCallbackContext,
const DWORD dwFlags)
Arguments:

| | |
|---|---|
| DWORD dwCPU | CPU queue on which item is to be placed, or −1 for any. |
| PFNDPTNWORKCALLBACK pfnWorkCallback | Callback to execute as soon as possible. |
| PVOID pvCallbackContext | User specified context to pass to callback. |
| DWORD dwFlags | Flags to use when queueing. |
| Returns: HRESULT | |
| DPN_OK | Queuing the work item was successful. |
| DPNERR_OUTOFMEMORY | Not enough memory to queue the work item. |

IDirectPlay8ThreadPoolWork::ScheduleTimer
(const DWORD dwCPU,
const DWORD dwDelay,
const PFNDPTNWORKCALLBACK pfnWorkCallback,
PVOID const pvCallbackContext,
void ** const ppvTimerData,
UINT * const puiTimerUnique,
const DWORD dwFlags)
Arguments:

| | |
|---|---|
| DWORD dwCPU | CPU on which item is to be scheduled, or −1 for any. |
| DWORD dwDelay | How much time should elapsed before executing the work item, in ms |
| PFNDPTNWORKCALLBACK pfnWorkCallback | Callback to execute when timer elapses. |
| PVOID pvCallbackContext | User specified context to pass to callback. |
| void ** ppvTimerData | Place to store pointer to data for timer so that it can be cancelled. |
| UINT * puiTimerUnique | Place to store uniqueness value for timer so that it can be cancelled. |
| Returns: HRESULT | |
| DPN_OK | Scheduling the timer was successful. |
| DPNERR_OUTOFMEMORY | Not enough memory to schedule the timer. |

IDirectPlay8ThreadPoolWork::StartTrackingFileIo
(const DWORD dwCPU,
const HANDLE hFile,
const DWORD dwFlags)
Arguments:

| | |
|---|---|
| DWORD dwCPU | CPU with which I/O is to be tracked, or −1 for all. |
| HANDLE hFile | Handle of file to track. |
| DWORD dwFlags | Flags to use when starting to track file I/O. |
| Returns: HRESULT | |
| DPN_OK | Starting tracking for the file was successful. |
| DPNERR_ALREADYREGISTERED | The specified file handle is already being tracked. |
| DPNERR_OUTOFMEMORY | Not enough memory to track the file. |

IDirectPlay8ThreadPoolWork::StopTrackingFileIo
(const DWORD dwCPU,
const HANDLE hFile,
const DWORD dwFlags)
Arguments:

| | |
|---|---|
| DWORD dwCPU | CPU with which I/O was tracked, or −1 for all. |
| HANDLE hFile | Handle of file to stop tracking. |
| DWORD dwFlags | Flags to use when no turning off file I/O tracking. |
| Returns: HRESULT | |
| DPN_OK | Stopping tracking for the file was successful. |
| DPNERR_INVALIDHANDLE | File handle was not being tracked. |

IDirectPlay8ThreadPoolWork::CreateOverlapped
(const DWORD dwCPU,
const PFNDPTNWORKCALLBACK pfnWorkCallback,
PVOID const pvCallbackContext,
OVERLAPPED ** const ppOverlapped,
const DWORD dwFlags)
Arguments:

| | |
|---|---|
| DWORD dwCPU | CPU with which I/O is to be monitored, or −1 for any. |
| PFNDPTNWORKCALLBACK pfnWorkCallback | Callback to execute when operation completes. |
| PVOID pvCallbackContext | User specified context to pass to callback. |
| OVERLAPPED * pOverlapped | Pointer to overlapped structure used by OS. |
| DWORD dwFlags | Flags to use when submitting I/O. |
| Returns: HRESULT | |

-continued

| | |
|---|---|
| DPN_OK | Creating the structure was successful. |
| DPNERR_OUTOFMEMORY | Not enough memory to create the structure. |
| IDirectPlay8ThreadPoolWork::SubmitIoOperation | |
| (OVERLAPPED * const pOverlapped, | |
| const DWORD dwFlags) | |
| Arguments: | |
| OVERLAPPED * pOverlapped | Pointer to overlapped structure to monitor. |
| DWORD dwFlags | Flags to use when submitting I/O. |
| Returns: HRESULT | |
| DPN_OK | Submitting the I/O operation was successful. |
| IDirectPlay8ThreadPoolWork::ReleaseOverlapped | |
| (OVERLAPPED * const pOverlapped, | |
| const DWORD dwFlags) | |
| Arguments: | |
| OVERLAPPED * pOverlapped | Pointer to overlapped structure to release. |
| DWORD dwFlags | Flags to use when releasing structure. |
| Returns: HRESULT | |
| DPN_OK | Releasing the I/O operation was successful. |
| IDirectPlay8ThreadPoolWork::CancelTimer | |
| (void * const pvTimerData, | |
| const UINT uiTimerUnique, | |
| const DWORD dwFlags) | |
| Arguments: | |
| void * pvTimerData | Pointer to data for timer being cancelled. |
| UINT uiTimerUnique | Uniqueness value for timer being cancelled. |
| DWORD dwFlags | Flags to use when cancelling timer. |
| Returns: HRESULT | |
| DPN_OK | Cancelling the timer was successful. |
| DPNERR_CANNOTCANCEL | The timer could not be cancelled. |
| IDirectPlay8ThreadPoolWork::WaitWhileWorking | |
| (const HANDLE hWaitObject, | |
| const DWORD dwFlags) | |
| Arguments: | |
| HANDLE hWaitObject | Handle on which to wait. |
| DWORD dwFlags | Flags to use when waiting. |
| Returns: HRESULT | |
| DPN_OK | The object became signalled. |
| IDirectPlay8ThreadPoolWork::SleepWhileWorking | |
| (const DWORD dwTimeout, | |
| const DWORD dwFlags) | |
| Arguments: | |
| DWORD dwTimeout | Timeout for the sleep operation. |
| DWORD dwFlags | Flags to use when sleeping. |
| Returns: HRESULT | |
| DPN_OK | The sleep occurred successfully. |
| IDirectPlay8ThreadPoolWork::RequestTotalThreadCount | |
| (const DWORD dwNumThreads, | |
| const DWORD dwFlags) | |
| Arguments: | |
| DWORD dwNumThreads | Desired number of threads. |
| DWORD dwFlags | Flags to use when setting the thread count. |
| Returns: HRESULT | |
| DPN_OK | Requesting the number of threads was successful. |
| DPNERR_ALREADYINITIALIZED | The user has already set an incompatible number of threads. |
| IDirectPlay8ThreadPoolWork::GetThreadCount | |
| (const DWORD dwCPU, | |
| DWORD * const pdwNumThreads, | |
| const DWORD dwFlags) | |
| Arguments: | |
| DWORD dwCPU | CPU whose thread count is to be retrieved, or −1 for total thread count |
| DWORD * pdwNumThreads | Pointer to DWORD in which to store the current number of threads per processor. |
| DWORD dwFlags | Flags to use when retrieving thread count. |
| Returns: HRESULT | |
| DPN_OK | Retrieving the number of threads specified by user was successful. |
| DPNSUCCESS_PENDING | The user hasn't specified a thread count, but the number requested by work interfaces is available. |
| DPNERR_NOTREADY | No thread count has been specified yet. |
| IDirectPlay8ThreadPoolWork::GetWorkRecursionDepth | |
| (DWORD * const pdwDepth, | |
| const DWORD dwFlags) | |
| Arguments: | |

-continued

| | |
|---|---|
| DWORD * pdwDepth | Place to store recursion depth of current thread. |
| DWORD dwFlags | Flags to use when retrieving recursion depth. |
| Returns: HRESULT | |
| DPN_OK | The recursion depth was retrieved successfully. |

What is claimed:

1. A method for handling multithreaded execution of network events for an application comprising:
   accepting a thread pool size indication from said application indicating a number of dedicated threads to maintain in a dedicated thread pool;
   maintaining a queue comprising one or more network work items;
   choosing an execution procedure, from a choice comprising two options, based on whether said thread pool size indication is zero or non-zero; and
   executing one or more network work items using the chosen execution procedure,
   wherein a first of said two options comprises:
      managing a thread pool comprising a number of dedicated threads, where said number is based on said thread pool size indication and
      allowing a network work item from said queue to execute on one of said dedicated threads,
   and wherein a second of said two options comprises:
      allowing network work items from said queue to execute only when indicated by said application that network work items may be performed,
   wherein said choosing chooses said first of said two options in the case where said thread pool size indication is non-zero, and wherein said choosing chooses said second of said two options in the case where said thread pool size indication is zero.

2. The method of claim 1, where said application comprises one or more callback methods for handling network events, and where said network work items comprise execution of said callback methods.

3. The method of claim 1, further comprising:
   maintaining one or more timers;
   choosing a timer check procedure, from a choice comprising two timer check options, based on whether said thread pool size indication is zero or non-zero; and
   checking said one or more timers using the chosen timer check procedure, wherein a first of said two timer check options comprises:
      executing a timer check on said timers using one of said dedicated threads;
   and wherein a second of said two timer check options comprises
      executing a timer check on said timers only when indicated by said application that network work items may be performed,
   wherein said choosing of said timer check procedure chooses said first of said two timer check options in the case where said thread pool size indication is non-zero, and wherein said choosing chooses said second of said two timer check options in the case where said thread pool size indication is zero.

4. The method of claim 3, where said timer check procedure comprises:
   determining that at least one of said timers has expired; and
   queuing a network work item on said queue.

5. The method of claim 1, further comprising:
   tracking one or more input/output operations;
   choosing a completion check procedure, from a choice comprising two completion check options, based on whether said thread pool size indication is zero or non-zero; and
   executing a completion check on said input/output operations in accordance with the chosen completion check procedure,
   wherein a first of said two completion check options comprises:
      executing said completion check on said input/output operations using one of said dedicated threads;
   and wherein a second of said two completion check options comprises:
      executing said completion check on said input/output operations only when indicated by said application that network work items may be performed,
   wherein said choosing of said completion check procedure chooses said first of said two completion check options in the case where said thread pool size indication is non-zero, and wherein said choosing chooses said second of said two timer check options in the case where said thread pool size indication is zero.

6. The method of claim 5, where said completion check on input/output operations comprises:
   determining that at least one of said input/output operations has completed; and
   queuing a network work item on said queue.

7. The method of claim 1, where said allowing a network work item from said queue to execute comprises:
   determining that a timer has elapsed;
   queuing a network work item related to said timer elapse on said queue;
   determining that an input/output operation has completed;
   queuing a network work item related to said input/output operation completion on said queue;
   dequeuing a network work item and executing a callback indicated in said network work item.

8. The method of claim 1, where said dedicated threads comprise a timer dedicated thread, and where said thread is dedicated to checking whether any timers have elapsed and, if a timer has elapsed, queuing a network work item related to said timer elapse on said queue.

9. The method of claim 1, where said dedicated threads comprise an input/output (I/O) dedicated thread, and where said thread is dedicated to checking whether any I/O operations have completed and, if an I/O operation has completed, queuing a network work item related to said I/O operation completion on said queue.

10. The method of claim 1, where said thread pool size indication may be changed during execution of said application, and where said step of managing a thread pool further comprises:
    changing said number of dedicated threads in response to a change in thread pool size indication.

11. The method of claim 10, where said step of changing said number of dedicated threads in response to a change in thread pool size indication further comprises:
  if said change in thread pool size indication indicates reduction in thread pool size, destroying one or more threads; and
  if said change in thread pool size indication indicates an increase in thread pool size, creating one or more threads.

12. The method of claim 1, where said step of allowing network items from said queue to execute only when indicated by said application that said network work items may be performed comprises:
  accepting a timing indication from said application of how long should be spent performing said network work items; and
  allowing network items from said queue to execute according to said timing indication.

13. A method for handling multithreaded execution of network events for an application using a thread pool of dedicated threads, comprising:
  providing a function executable by said application for setting the number of dedicated threads in said thread pool;
  queuing network work items;
  providing a function executable by said application for executing said network work items; and
  choosing an execution procedure, from a choice comprising two options, based on whether said thread pool size indication is zero or non-zero; and
  executing said network work items in accordance with the chosen execution procedure,
wherein a first of said two options comprises:
  using of said function by said application to execute said network work items, and wherein a second of said two options comprises:
  executing said network work items on said dedicated threads,
wherein said choosing chooses said first of said two options when said number of dedicated threads in said thread pool is zero, and wherein said choosing chooses said second of said two options when said number of dedicated threads in said thread pool is greater than zero.

14. The method of claim 13, further comprising:
  providing at least one of the following:
    a function executable by said application for creating said thread pool;
    a function executable by said application for destroying said thread pool;
    a function executable by said application for determining the number of threads in said thread pool; and
    a function executable by said application for determining the number of threads in said thread pool resident on a specified one of two or more processors.

15. The method of claim 13, where a core network API generates network work items, said method further comprising:
  providing a function executable by said core network API for queuing a specified network work item.

16. The method of claim 15, further comprising:
  providing one or more of the following:
    a function executable by said core network API for causing a thread on which it is executed to wait for a kernel object to become signaled;
    a function executable by said core network API for causing a thread on which it is executed to sleep for a specified time period;
    where two or more processors are being used, a function executable by said core network API for requesting that a certain number of threads be assigned to each of said two or more processors;
    a function executable by said core network API for determining the number of threads in said thread pool;
    where two or more processors are being used, a function executable by said core network API for determining the number of threads in said thread pool resident on a specified one of said two or more processors; and
    a function executable by said core network API for getting a recursion depth of the thread specified.

17. The method of claim 15, where overlapped input/output (I/O) operations are tracked, further comprising:
  providing one or more of the following:
    a function executable by said core network API for tracking overlapped I/O operations for a specified file handle;
    for ending the tracking of overlapped I/O operations for a specified file handle;
    for creating an overlapped structure for asynchronous I/O operation;
    for submitting an overlapped structure for asynchronous I/O operation;
    for returning an overlapped structure for asynchronous I/O operation.

18. A system that provides a network interface to an application, the system compnsing:
  a queue that stores work items to be performed;
  a processing module that generates work items based on events and queues said work items on said queue, said events comprising:
    receiving data from a network; and
  a publishing module that invokes callbacks in said application based on the work items on the queue, the publishing module invoking said callbacks on one or more threads in said application that have been designated for processing callbacks if such threads have been designated, the publishing module invoking the callbacks only when requested to do so by said application if no such threads have been designated.

19. The system of claim 18, wherein said events further comprise timer checks generated by a timer module.

20. The system of claim 18, wherein said events further comprise events related to overlapped I/O operations.

21. The system of claim 18, wherein the publishing module exposes a dowork method to the application, and wherein said application invokes the dowork method to request that said publishing module perform tasks based on said work items on said queue.

22. The system of claim 18, wherein said dowork method allows its caller to specify an amount of time to be spent by said publishing module before said dowork method returns.

23. The system of claim 18, wherein the publishing module exposes a thread pool size setting method which sets the number of threads designated for processing callbacks.

* * * * *